United States Patent [19]

Whitely et al.

[11] Patent Number: 4,499,134
[45] Date of Patent: Feb. 12, 1985

[54] ABRASION AND HIGH TEMPERATURE RESISTANT COMPOSITE AND METHOD OF MAKING THE SAME

[75] Inventors: Elliot F. Whitely, Milton Hills; Richard A. Devoe; Gerald W. Gadbois, both of Rochester, all of N.H.

[73] Assignee: Lydall, Inc., Manchester, Conn.

[21] Appl. No.: 544,863

[22] Filed: Oct. 24, 1983

[51] Int. Cl.³ .............................................. B32B 3/06
[52] U.S. Cl. ................................. 428/102; 156/148; 428/105; 428/109; 428/111; 428/233; 428/247; 428/251; 428/340
[58] Field of Search ............... 428/102, 105, 109, 111, 428/233, 234, 235, 236, 247, 251, 255, 256, 282, 285, 300, 340; 156/148

[56] References Cited

U.S. PATENT DOCUMENTS

| | | | |
|---|---|---|---|
| 2,726,977 | 12/1955 | See et al. | 428/102 |
| 3,794,551 | 2/1974 | Landingham et al. | 428/256 |
| 4,086,737 | 5/1978 | Byrd | 428/234 |
| 4,123,886 | 11/1978 | Byrd | 428/234 |
| 4,273,824 | 6/1981 | McComas et al. | 428/256 |
| 4,282,283 | 8/1981 | George | 428/228 |
| 4,443,509 | 4/1984 | Sauder | 428/256 |

*Primary Examiner*—James J. Bell
*Attorney, Agent, or Firm*—Murray, Whisenhunt & Ferguson

[57] ABSTRACT

There is provided a composite having improved structural integrity and suitable for use in abrasive, high temperature environments. The composite comprises randomly laid and oriented heat resistant fibers interlocked together into the form of a shape sustaining paper having two lateral surfaces. The paper has a thickness of from about 0.01 to 0.50 inch. An abrasion-resistant, high temperature resistant scrim is disposed upon at least one of the lateral surfaces of the paper, and a network of abrasion-resistant, high temperature-resistant threads is stitched through the scrim and the paper such that the scrim is mechanically locked to the paper by said threads. The network of threads and the scrim substantially retain the structural integrity of the said paper in use in the abrasive, high temperature environments.

22 Claims, 2 Drawing Figures

ABRASION AND HIGH TEMPERATURE RESISTANT COMPOSITE AND METHOD OF MAKING THE SAME

The present invention relates to an abrasion and high temperature resistant composite, and to the method for making the same, which composite has improved structural integrity in abrasive, high temperature environments. More particularly the invention relates to such composites wherein the improved structural integrity is maintained even after long service in the abrasive and high temperature environments.

BACKGROUND OF THE INVENTION

High temperature resistant sheet materials are well known to the art and are used under various high temperature conditions. These sheet materials are known in the art as "papers", since they are often made by methods similar to paper-making methods, although the thickness thereof can be up to one-half inch or more. The papers are often used as protective lining against high temperature, but they have other uses, such as a high temperature filtering medium. Most often, these papers are made by laying staple fibers into a matt and consolidating the matt into a paper, although other processes may be used. The staple fibers used in making these papers are heat resistant inorganic fibers such as glass, metal or ceramic fibers. By virtue of the laying operation, the staple fibers are randomly oriented and, with consolidation, are interlocked together into the form of a shape sustaining paper having two lateral surfaces.

The paper has considerable structural integrity due to the random orientation and interlocking of the fibers, but that structural integrity is quickly deteriorated by mechanical action on the paper, such as abrasion.

To avoid the loss of structural integrity during mechanical action, e.g. abrasion, the papers often have a binder applied thereto. These binders take various forms, but generally speaking the binders are organic polymers such as phenolics, acrylics and epoxies. The binders serve to improve the structural integrity of the papers during manufacture and fabrication of the papers into products.

However, the binders of these papers, while quite satisfactory at ambient temperatures, will begin to lose the binding effect at elevated temperatures, with a concomitant loss of structural integrity of the papers. At even higher temperatures, and the temperatures at which these protective papers are normally used, the binder will burn away and the structural integrity of the paper will again depend entirely upon the interlocking of the fibers. This is quite satisfactory for papers which do not experience considerable mechanical action in use, since once the paper has been mechanically manipulated, conformed and fitted to the configuration of the particular apparatus in which it is used, it is most often held in place by the apparatus itself and substantial independent structural integrity of the paper itself is not required.

As an example of the foregoing, these papers are often fabricated into high temperature resistant gaskets. Thus, once the paper has been manipulated and configured into a proper shape, etc. for the gasket, and installed, there is no need for higher structural integrity, since the gasket will be held in place by the apparatus itself. As another example, these papers are often fabricated into insulating liners for stationary kilns. Once the papers have been cut, etc. and fitted to the kiln walls, the papers are held in place by the fire bricks lining the kiln and no higher structural integrity is required. Thus, in both of these examples it is of no substantial concern that the binder burns away in use and the structural integrity of the papers is materially reduced.

On the other hand, serious problems have been faced in the art when these papers are used under conditions where the papers are subjected to substantial mechanical action after the binder has been burned away. For example, these papers are used as a protective back-up thermal insulator between the shell and the fire bricks of high temperature rotary kilns. The usual binders of these papers are quite sufficient for allowing the papers to be cut, configured, and installed on the kiln shell and to sustain the mechanical action of placing the fire bricks on the installed paper. However, with operation of the kiln, the natural movement of the bricks, relative to the shell of the kiln during rotation of the kiln, causes substantial mechanical action on the paper. Once the binder has burned away, the structural integrity of the paper is so reduced that the mechanical action of the bricks, relative to the shell, will eventually destroy the paper and the protective value thereof.

As another example, these papers are used in high temperature gas filtration. Again, the binder is quite satisfactory for fashioning the filters, e.g. flat filters or bag filters, but after the filter is used in high temperature operation, the binder burns away and the structural integrity of the papers results solely from the interlocking of the inorganic fibers. This remaining integrity is not sufficient to withstand the flexing of the filters, and filters made of these papers will ultimately deteriorate, tear and otherwise become unserviceable.

Such material action on the papers, as described above, is referred to as an abrasive action, since it causes the interlocked fibers to move relative to one another and literally abrade each other, causing deterioration of the interlocking, and, hence, deterioration of the structural integrity. This abrasion, however, may be the result of a number of different induced mechanical actions, including flows of fluid across or through the papers, flexing of the papers, relative movement of apparatus next to the papers, and the like.

The art has sought solutions to the problems of these papers being used in such abrasive, high temperature environments, i.e. where the binder is burned away and the abrasive action deteriorates the structural integrity of the papers. One approach in the art has been the search for improved binders, with the hope that the binders would sustain higher temperatures for longer time periods and, thus, preserve the structural integrity of the papers for longer time periods. Some success in this approach has been achieved, but since most of the binders are organic-based binders, e.g. polymers, those binders cannot withstand the higher temperatures to which these papers are subjected and no organic binder, currently available, is capable of substantially increasing the life of these papers in abrasive, high temperature environments.

Another approach in the art has been that of increasing amount of binder in order to prolong the life of the paper, but increased amounts of binder significantly decrease the workability of the paper and particularly in fitting those papers to irregularly shaped apparatus. Further, the increased amount of binder does not substantially extend the life of the paper in abrasive, high temperature environments.

It would be, therefore, of considerable advantage to the art to provide such papers, of the nature described above, wherein the structural integrity of the papers can be largely maintained at higher temperatures where the binder burns away from the papers and where the papers are subjected to abrasion, as described above.

OBJECTS OF THE INVENTION

It is therefore an object of the present invention to provide such materials having improved structural integrity and suitable for use in an abrasive, high temperature environment. It is a further object of the invention to provide such materials where the structural integrity is largely maintained even when the material is used at temperatures sufficiently high that the binder of the material is burned away. It is a further object of the invention to provide such materials which can be relatively inexpensively made, are easy to manipulate, shape, form and the like, and which can be used both for original construction purposes and for repair purposes. It is a further object of the invention to provide methods for producing such materials. Other objects will be apparent from the following description of the invention and from the annexed claims.

BRIEF DESCRIPTION OF THE INVENTION

The invention is based on three primary discoveries and several subsidiary discoveries. The first discovery is that the binder, being usually based on an organic compound, e.g. a polymer, has a limited burn out life in high temperature environments, and that the binder cannot be expected to retain the structural integrity of these papers for sustained periods of time in high temperature environments. This is true irrespective of the improvements which may be made in binder compositions. With this first understanding, it was further concluded that in order to provide retained structural integrity of the papers in an abrasive, high temperature environment, some mechanical means, rather than a chemical binding means, must be provided.

As a second basic discovery, it was found that mechanical means suitable for retaining the structural integrity of the papers are very suitably in the form of at least one scrim disposed on at least one lateral surface of the papers thus forming a composite thereof. The scrim need not contribute any substantial thermal protecting properties, or the like, but need only to contribute an abrasion-resistant surface. Thus, it was found that the scrim can be a very lightweight scrim, so long as the scrim has a very high degree of structural integrity, as compared with the structural integrity of the paper of the composite, so as to provide the required abrasion-resistant surface. Scrims of high structural integrity are known to the art and can be produced by relatively inexpensive methods such as the fusing of randomly oriented molten extruded fibers and filaments or by the weaving of yarns. Thus the scrim can be either a woven or non-woven scrim.

As a third basic discovery, it was found that a suitable mechanical attachment of the scrim to the paper in forming the composite is by way of stitching the scrim to the paper. It will be appreciated that stitching will firmly attach the scrim to the paper, and stitching has important adantages when a scrim is used in the lateral surfaces as more fully explained below.

As a subsidiary discovery in this regard, it was found that while the stitching may be random, better results are obtained when the stitching is in a patterned form, particularly when a scrim is used on both lateral surfaces, such that the retained structural integrity is essentially uniform over the length and width of the composite. As a further subsidiary discovery, it was found that a repeating quilting pattern of stitching is particularly advantageous.

As can, before, be appreciated the invention involves a composite of the paper and the scrim stitched together. Thus, even though the binder will burn away from the paper, the scrim, stitched to the paper, will allow the composite to substantially retain its structural integrity.

Thus, briefly stated, the present invention provides a composite having improved structural integrity and suitable for use in abrasive, high temperature environments, comprisingly randomly laid and oriented heat resistant fibers interlocked together into the form of a shape sustaining paper having two lateral surfaces. The paper has a thickness of from about 0.01 to 0.05 inch. An abrasion-resistant, high temperature resistant scrim is disposed upon at least one of the lateral surfaces of the paper. A network of abrasion-resistant, high temperature-resistant threads are stitched through the scrim and the paper such that the scrim is mechanically locked to the paper by the threads.

With this arrangement, the network of threads and the scrim substantially retain the structural integrity of the composite.

The composite is preferably made by laying heat resistant fibers into a laid matt and consolidating the laid matt into a paper of about 0.01 to 0.05 inch thick and having two lateral surfaces. An abrasion-resistant, high temperature resistant scrim is applied to at least one lateral surface of the paper and the scrim is stitched to the paper with a network of abrasion-resistant, high temperature resistant threads.

DETAILED DESCRIPTION OF THE INVENTION

Figure 1:
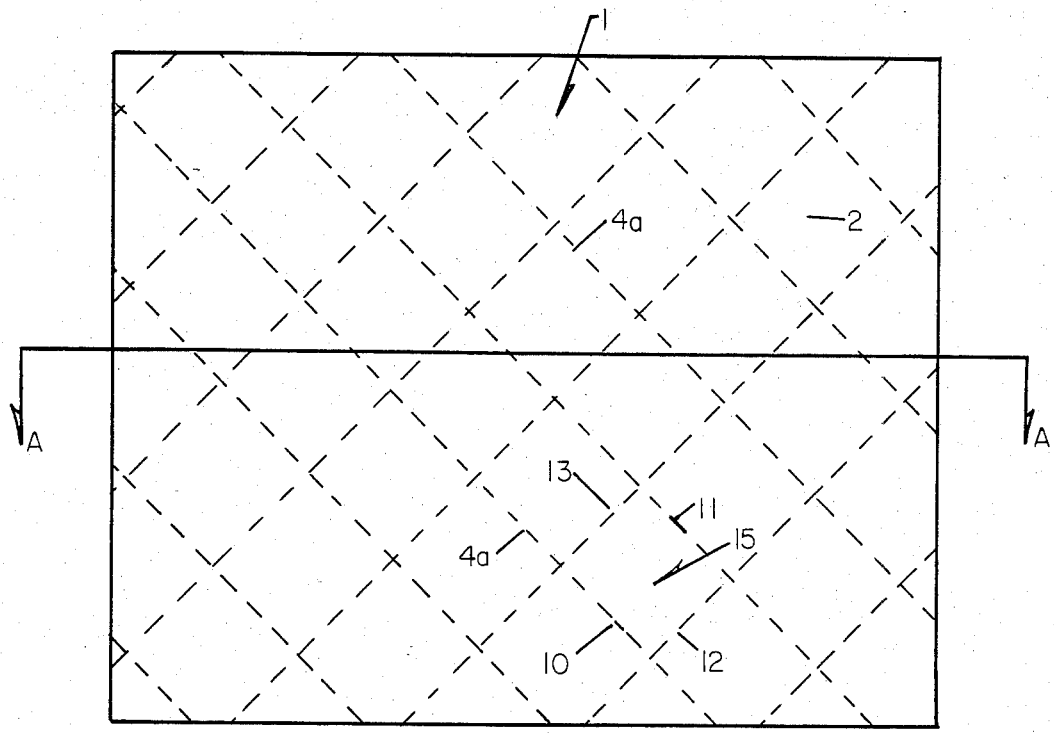
FIG. 1 is a top-view of a preferred embodiment of the invention, showing the composite and a patterned stitching of a scrim onto a paper.

It should be initially appreciated that the paper of the present composite can be any of the high temperature papers known to the art. For example the papers may be a needled felt, a dry or liquid laid non-woven fabric, or the like, including the more traditional papers made by a process similar to the paper making process. Hence, the details of these papers, and the processes for making those papers, will not be recited herein for sake of conciseness, but instead an overall description of a preferred embodiment of papers and processes therefor will be presented for continuity of understanding the present invention.

Thus, briefly stated, the papers of the preferred embodiment of present invention, are randomly laid and oriented heat and resistant fibers. The laying, which can be by either a conventional dry-lay or a conventional wet-lay process, causes the fibers to randomly orient and interlock together during the laying process into a matt. The matt is then consolidated into a paper by any one or more or a number of known processes, such as a roto former or a Fourdrinier machine or the like. These papers will, generally, have a thickness of about 0.01 to 0.05 inch, especially 0.01 to 0.3 inch and will generally have an overall bulk density of between 5 and 15 lbs/ft$^3$.

After the paper, with the above characteristics, is prepared, by any selected conventional process, a binder may be applied to the paper. Optionally, a soluble binder may be dissolved in a liquid of a wet process and retained in the paper after consolidation. Further optionally, the binder may be in the form of soluble or fusable fibers used in a wet or dry process and disposed in the paper as produced. All of the foregoing is well known in the art and no further details are necessary.

It is, however, not necessary to include a binder in the paper at all. This is because the binder will ultimately burn away, as explained above, and in many cases the required manipulations of the composite in fabrication and installation do not require the added initial structural integrity of the composite provided by a binder. When a binder is used the binder will have an affinity for the fibers of the paper and will be substantially uniformly distributed among those fibers. The binder should be capable of sufficiently binding the fibers together such that the paper has a structural integrity sufficient to withstand substantial continued ambient flexing of the paper without substantial loss of the structural integrity of the paper. Thus, with the binder therein, the paper may be substantially shaped, manipulated, cut, pressed and the like for forming the paper to the particular mechanical apparatus which it is to protect.

It should be clearly understood that when a binder is used, that binder is burned away either before or during the use of the composite. For example, the composite may be installed between the shell and fire bricks of a rotary kiln. While the installation will be while the kiln is at ambient temperatures, once the kiln is placed in operation, some movement of the composite will inevitably occur as the composite adjusts itself to the fire bricks and the particular irregularities of the shell. The binder, during this adjustment period, will begin to degrade and burn away. Once that adjustment period has been completed, and the binder is subjected to the higher temperatures for longer times, the binder will completely burn away and provide essentially no structural integrity to the composite.

Alternatively, the binder may be purposely burned away either prior to or after fabricating the composite into an article, such as a seal, or prior to or after installation of the article. This is because the products of combustion of the binder can not be tolerated in some apparatus, especially during the use of the apparatus in some processes. Thus, in these cases it is necessary to remove any binder which may be present.

A number of binders are known to the art, and they are generally organic polymers, although some inorganic polymers and "glasses" have been suggested and used by the art. Nevertheless, the usual binders are made of polyvinylchloride, polyvinylacetate/alcohol, phenolic, acrylic and epoxy polymers. They are normally added to the paper at add-ons of from 1% to 20% (the weight of the paper and binder is 1% to 20% greater than the weight of the paper alone.)

After the paper has been prepared in the conventional manner, as described above, including the application of the binder, if desired, along with any curing of the binder as may be required for the particular binder, an abrasion-resistant high temperature scrim is disposed upon at least one of the lateral surfaces of the paper. The scrim may be, of course, disposed on both lateral surfaces of the paper and this will concomitantly provide additional structural integrity to the paper once the binder, if used, has turned away. Indeed, the use of a scrim on both lateral surfaces is the preferred form of the invention. Nevertheless, for many applications, the scrim need be on only one lateral surface of the paper.

The fibers used in producing all of the paper, scrim and threads will be heat resistant fibers, e.g. inorganic fibers such as glass, metal, or ceramic fibers. The fibers, as originally manufactured, may be either in staple or continuous form. For example, in manufacturing the paper, one method of manufacture is that of extruding an inorganic material, e.g. glass, in continuous filament form, and allowing that continuous filament form to interlock and intertwine, as described above, in forming the paper. Similarly, the lightweight scrim can be formed from continuous filaments. Likewise, the stitching threads can be in the form of continuous extruded filaments. However, the more usual and more conventionally operated processes for producing all of the paper, scrim and stitching threads utilize staple fibers, and in these conventional processes, the staple fibers are formed into papers by wet or dry laid processes, as described above, and consolidated into the more dense paper. Scrims can be similarly produced, but of course in this regard the scrims will be exceedingly lightweight, as opposed to papers. Alternatively, in producing the scrims and stitching threads, the staple fibers may be spun into threads and the threads used for weaving scrims or for the stitching threads. Accordingly, in the Specification and following claims, the term "fibers" is to be given the broader definition and include both staple fibers and continous fibers (filaments). In regard to the staple fiber lengths and in regard to the fiber deniers, these can vary quite widely, e.g. from deniers as low as a few microns to very high deniers, e.g. 10 to 12 denier or more and the length of the staple fibers can vary from as little as several thousandths of an inch all the way to continuous filaments as explained above. Thus, in connection with fiber length and denier, as the above illustrates, these are not critical and may be chosen as desired.

The fibers of all of the scrim, paper and threads are inorganic fibers, e.g. glass fibers, such as E or S glass fibers, ceramic fibers such as silica or aluminum-silica fibers, metal fiber such as copper, brass, bronze, aluminum, steel or aluminum fibers. However, it is preferred that the scrim and threads be made of glass fibers and the paper be made of ceramic fibers, especially alumina-silica fibers.

As noted above, scrim may be a woven or non-woven scrim and fibers of the scrim may be made of any heat and abrasion resistant inorganic material. Beyond this, the specific form of the scrim is not critical. Thus it can be a felted fabric, a spun boned film, a woven fabric or woven mesh, e.g. metal wire woven mesh, and the like. It is only necessary that the scrim be abrasion resistant, high temperature resistant, flexible and capable of being securely stitched. Any of the conventional scrims made of inorganic fibers have these characteristics and may be used. However, ordinary woven glass fabric is most economical and is a preferred from of the invention. These scrim can be quite light and have a weight of from 0.5 to 10 oz/yd$^2$, although weights of between about 1 and 5 oz./yd$^2$ are preferred. This is true whether the scrim is a woven scrim or a non-woven scrim. This is also true whether or not a scrim is disposed on both lateral surfaces of the paper or only one lateral surface of the paper.

The scrim or scrims are attached to the paper by way of a network of abrasion-resistant, high temperature-resistant threads (staple or continuous fibers) stitched through the scrim and the paper such that the scrim is mechanically locked to the paper by the threads. The network of threads are stitched through the scrim and paper in either a patterned configuration or a random configuration. Thus, the threads may be simply laid onto the scrim and needled through the scrim and paper by needle-punching and this will produce a random configuration of the threads passing through the scrim and paper. Of course, if a scrim is placed on both sides of the paper, then such needle-punching must either be from both sides of the paper or after needle-punching a scrim on one side, the paper is reversed and another scrim is needle-punched on the other side.

Figure 2:
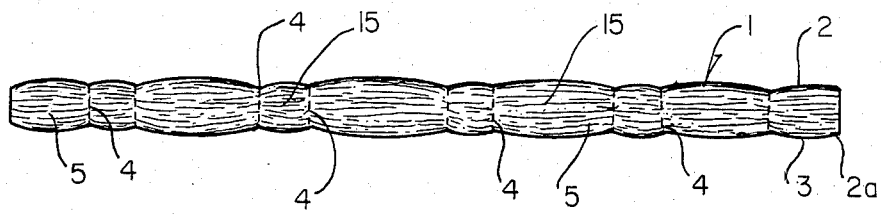
FIG. 2 is a cross-section view taken along A—A of FIG. 1.

However, it is greatly preferred that the threads are stitched through the scrim and paper in a patterned configuration and that the patterned configuration is a stitching achieved by sewing. This preferred embodiment can be seen in FIGS. 1 and 2. Thus, as can be seen from FIGS. 1 and 2, the composite, generally 1, is composed of a scrim 2 on one lateral surface, and preferrable a scrim 3 on the other lateral surface but the composite may have only one scrim on one lateral surface. The scrims are mechanically locked to the paper by threads 4 in the form of stitching lines of threads 4a which pass through scrim 2 and 3, as well as paper 5. The preferred embodiment shown in FIGS. 1 and 2 is a pattern of stitching, achieved by sewing, in the form of a repeating quilting pattern. The patterns of the quilting repeat at least every four inches, and more preferably at least every two inches. However, the patterns may repeat at much greater or smaller spaced intervals. In this regard, stitching line 10 is no more than four inches from stitching line 11, and more preferably no more than two inches. Similarly, stitching line 12 is no more than four inches, and preferably no more than two inches from stitching line 13. The term "quilting" as used in the specification and claims is intended to have the ordinary meaning of spaced apart lines of stitching which define and enclose unstitched portions.

The quilting pattern provides a particular advantage when used with the preferred embodiment of the invention, i.e., where a scrim is disposed on both lateral surfaces as shown in FIGS. 1 and 2. In this embodiment, the sewing threads 4 pass through the scrim 2 on one lateral surface, the paper 5 and the scrim 3 on the other lateral surface. Thus the paper is locked between the scrims and the stitching lines, e.g. between scrims 2 and 3 of FIG. 2 and stitching lines 10, 11, 12 and 13 of FIG. 1. This creates a quilting pocket 15 containing the enclosed portion of the paper. By this arrangement, even if the paper is abraded with long and/or severe service, the abraded fibers of the paper are none-the-less retained in the so formed pocket and the insulating properties thereof are largely retained. This feature of the invention is particularly important in severe service, such as a back-up thermal insulator between the fire bricks and the shell of a rotary kiln where kiln temperatures can easily reach 2000° F. or higher and the rotary motion of the kiln continually produces mechanical (and hence abrasive) action on the composite by reason of the continued vibration of the fire bricks next thereto.

The formation of such a quilting pocket between scrims on both lateral surfaces also provides advantages when the composite is used in apparatus where the mechanical action may take place on both sides of the composite, and this is an especially important feature of the invention. Thus, where the mechanical action is on both sides of the composite, the resultant abrasive action between fibers can not only be most severe but the mechanical action can be in opposite direction on the composite and, hence, magnify the resulting abrasive action. When this occurs, the abrasive action between fibers can very quickly destroy the structural integrity of the paper of the composite. Nevertheless, the overall structural integrity of the composite is maintained, since the abrasive resistant scrims remain intact and the fibers of the paper (even though no longer tightly interlocked) are retained in the quilting pocket and the thermal protection of the composite is maintained.

It can therefore be seen that even when the binder is degraded in high temperature use of the composite, (or when not used at all) the networks of threads forming the stitching and the scrims will allow substantial retention of the structural integrity of the composite during such abrasive action. This in turn provides a composite which has structural integrity, in abrasive, high temperature use, far greater than that which would be provided by the paper alone and the thermal protection of the composite remains intack.

The particular geometric shape of the repeating pattern is not critical and may be the diamond shape shown in FIG. 1, or it may be circular, oval, rectangular, triangular or square. Indeed, the pattern could be combinations of any of the foregoing or irregular shaped patterns such as are often found in bedding quilts, although there in no advantage thereto. In any event, the pattern and the spacing thereof should be sufficient to insure that the scrim is mechanically secured to the paper.

The scrim or scrims may be sewed to the paper by conventional sewing operations using conventional sewing machines, either of an automatic and multiple head nature or of a manually operated single head nature. Since sewing operations of this nature are well know to the art, they need not be described herein for sake of conciseness.

As noted above, the composite of the present invention may be used for original construction in apparatus, e.g. rotary kilns, or for the repair of existing insulating papers already installed in apparatus. The repaired sections may be simply laid in place or stitched in place. The stitching can be with the same threads as the threads used in preparing the composite. Various types of repairs may also be made, in this manner, such as the repairs described in U.S. Pat. No. 4,123,886, where a refractory fiber blanket furnace lining system is repaired by stitching folded sections in place. The details of this method need not be repeated herein and the entire disclosure of that patent is incorporated herein by reference. Indeed, the present composite may be used to repair other types of insulating blankets. For example, U.S. Pat. No. 4,282,283 discloses a woven or knitted fiberglass fabric bonded to a non-woven fabric so as to form a fiberglass/fabric composite that is highly resistant to damage caused by twisting and flexing forces, much for the same reason described above. The present composite may be used to repair blankets where the structural integrity thereof has been lost in high temperature operation.

The preferred method of producing the present composite is similar to that of the prior art in connection with the production of the paper. Thus, the preferred method includes laying heat resistant fibers into a laid matt, consolidating the laid matt (by conventional methods as described above) into a paper of about 0.01 to 0.05 inch. Optionally a binder is uniformly applied to the paper and cured, as appropriate to that binder. Thus, that portion of the process parallels the conventional process for producing papers of this nature and need not be described in detail herein.

However, the present process departs from the prior art in that after this paper is prepared, an abrasion-resistant, high temperature resistant scrim is applied to at least one lateral surface of the paper and the scrim is stitched to the paper with a network of abrasion-resistant, high temperature resistant threads by either the needling process or the sewing process as described above. The stitching is either the random or patterned stitching, as described above, but the same above-described quilting and size of quilting with scrims on both lateral surfaces are preferred.

The composite of the present invention may thus be used for the construction of a variety of ultimate products. Thus, it may be manipulated, cut, configured, sewn, etc. such that it is in the configuration of a rotary kiln back-up insulator for the fire bricks or in the configuration of a filter, e.g. a bag filter or in the configuration of an electrical cable tray liner.

The invention will now be illustrated in connection with the following example. However, it will be appreciated that the invention is not limited to the specific example, but extends to the breadth of the foregoing disclosure and annexed claims.

EXAMPLE

The paper used in this example is a high-temperature paper made by the Technical Papers Division of Lydall, Inc. and is commercially available as LYTHERM-1535. This paper is composed mainly of alumina-silica staple fibers. The paper is approximately 0.25 inch thick and has a density of approximately 7 lbs/ft$^3$. The paper has an acrylic binder at 6% add-ons.

The scrim used in this example is an industrial glass woven fabric commercially available from the Clark-Schwebel Company as No. 1675. The weight of the fabric is 2.8 oz/yard and is composed mainly of E-glass yarns.

The sewing threads used in this example are beta-grade E-glass threads, commercially available as B-4 sewing threads from the Owen-Corning Corporation.

The scrim was sewed to the paper with the threads on a multi-head sewing machine in a quilting pattern which repeated every two inches. The quilting pattern was a regularly shaped diamond. The threads were stitched with approximately one thread loop every 1/16 inch.

A rotary kiln insulator was fabricated from the composite and installed in a rotary kiln which was operated at approximately 2300° F. The insulator was periodically observed for six months and no evidence of deterioration was found.

Thus it will seem that the objects of the invention have been achieved.

It will also be appreciated that the present composite may be used in high-temperature abrasive conditions where ordinary papers cannot survive under those conditions. In this regard, the term "high-temperature" is defined to mean that temperature at which the binder of the paper would burn away. This temperature will vary with the particular binder, but generally speaking, all of the inorganic binders normally used in such papers will burn away at about 300° to 400° F., and nearly all of the binders will burn away at temperatures in excess of 500° F. Similarly, for purposes of the present specification and claims, the term "suitable for use in an abrasive environment" is to defined to means those environments where ordinary papers, by virtue of mechanical action thereon, would begin to quickly loose their structural integrity once the binder of the papers (if used) burned away. These terms and conditions will be easily understood and appreciated by those skilled in this art.

It will also be appreciated that various modifications of the foregoing disclosure will be apparent to those skilled in this art. For example, the ordinary degree of interlocking of fibers in making the paper may be substantially dispensed with and only a light interlocking or consolidation of the fibers of the paper will be required when scrims are used on both lateral surfaces, and the repeating quilting pattern forms the pockets, as explained above. Thus, the invention is intended to extend to the spirit and scope of the annexed claims.

What is claimed is:

1. A composite having improved structural integrity and suitable for use in abrasive, high temperature environments, comprising:
   (1) randomly laid and oriented heat resistant fibers interlocked together into the form of a shape sustaining paper having two lateral surfaces, said paper having a thickness of from about 0.01 to 0.50 inch.
   (2) an abrasion-resistant, high temperature resistant, flexible, woven or non-woven scrim having a weight of from 0.5 to 10 oz./yd$^2$ disposed upon at least one of the lateral surfaces of the said paper; and
   (3) a network of abrasion-resistant, high temperature-resistant threads stitched through said scrim and said paper in the form of stitching lines of a repeating enclosed pattern such that said scrim is mechanically locked to said paper by said threads;
   whereby, the said network of threads and said scrim substantially retain the structural integrity of the said paper under abrasion conditions.

2. The composite of claim 1 wherein the fibers of the paper, scrim and threads are made of inorganic fiber.

3. The composite of claim 2 wherein the fibers of the scrim and threads are glass fibers and the fibers of the paper are ceramic fibers.

4. The composite of claim 1 wherein the thickness of the paper is from 0.10 inch to 0.30 inch.

5. The composite of claim 1 wherein the paper has a binder disposed therein.

6. The composite of claim 5 wherein the binder is an organic polymeric binder and the polymer is selected from the group consisting of polyvinylchloride, polyvinyl-acetate/alcohol, phenolic, acrylic and epoxy polymers.

7. The composite of claim 6 wherein the add-on of binder to the paper is from 1% to 20%.

8. The composite of claim 1 wherein a scrim is disposed on both lateral surfaces of said paper.

9. The composite of claim 1 wherein the configuration is patterned and the stitching is by sewing.

10. The composite of claim 9 wherein the pattern is a repeating quilting pattern.

11. The composite of claim 10 wherein the pattern of the quilting repeats at least every four inches.

12. The composite of claim 11 wherein the pattern repeats at least every two inches.

13. The composite of claim 1 in the configuration of a back-up insulator for a rotary kiln.

14. The composite of claim 1 in the configuration of a filter.

15. The composite of claim 14 wherein the filter is a bag filter.

16. The composite of claim 1 is the configuration of an electrical cable tray liner.

17. A method for producing the composite of claim 1, comprising:
(1) laying heat resistant fibers into a laid matt;
(2) consolidating the laid matt into a paper of about 0.01 to 0.50 inch thick and having two lateral surfaces;
(3) applying an abrasion-resistant, high temperature resistant, flexible, woven or non-woven scrim having a weight of from 0.5 to 10 oz./yd$^2$ to at least one lateral surface of the paper; and
(4) stitching the scrim to the paper with a network of abrasion-resistant, high temperature resistant threads in the form of stitching lines of a repeating enclosed pattern.

18. The method of claim 17 wherein the fibers of the paper scrim and threads are made of inorganic fibers.

19. The method of claim 17 wherein a scrim is applied to both lateral surfaces of the paper.

20. The method of claim 17 wherein the stitching is by sewing.

21. The method of claim 17 wherein the pattern is a repeating quilting pattern.

22. The method of claim 21 wherein the pattern of the quilting repeats at least every four inches.

* * * * *